Oct. 16, 1934.   A. W. HAYDON   1,977,184
ELECTRIC MOTOR AND CLOCK
Filed Aug. 9, 1933   3 Sheets-Sheet 1
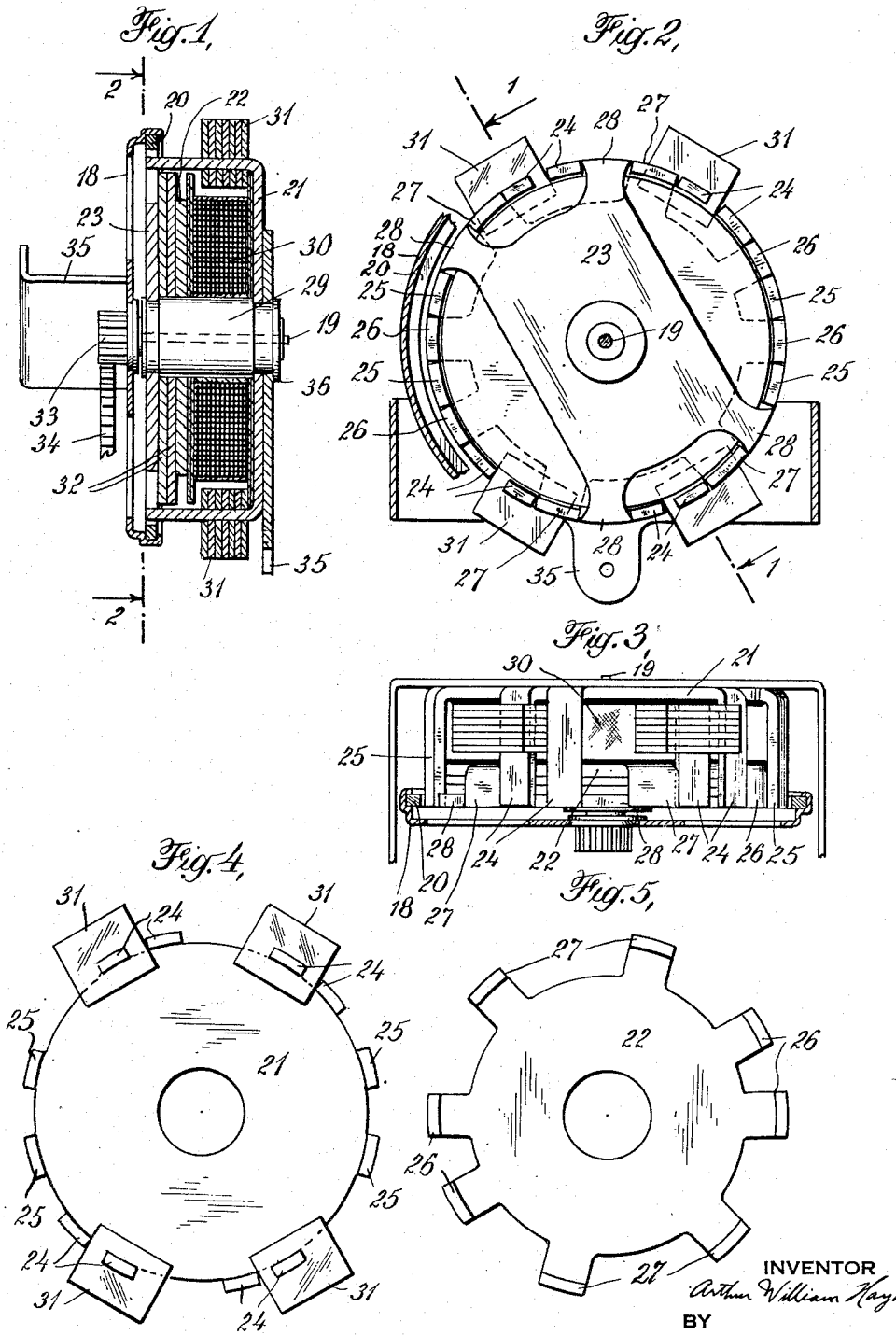
INVENTOR
Arthur William Haydon
BY
Pennie, Davis, Marvin & Edmonds
HIS ATTORNEYS

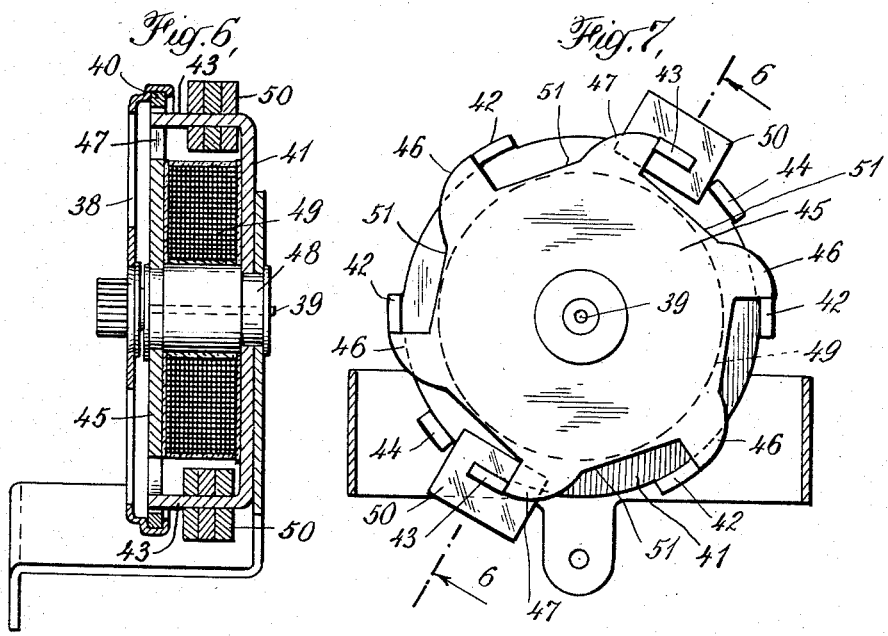
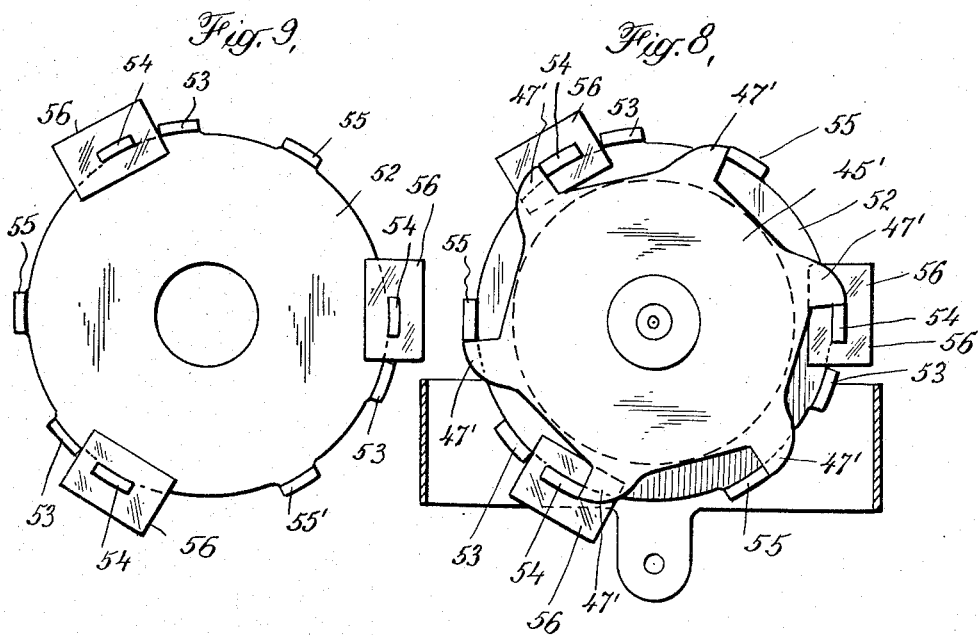

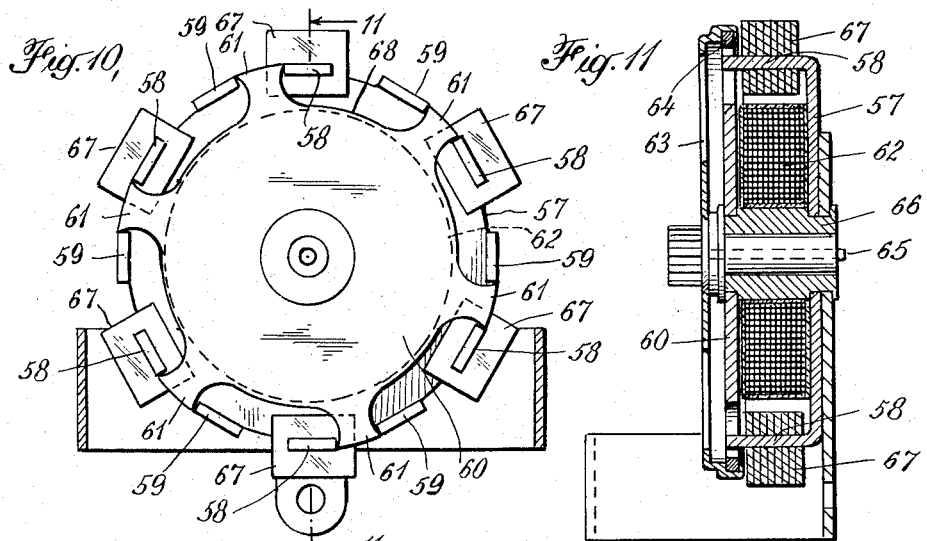
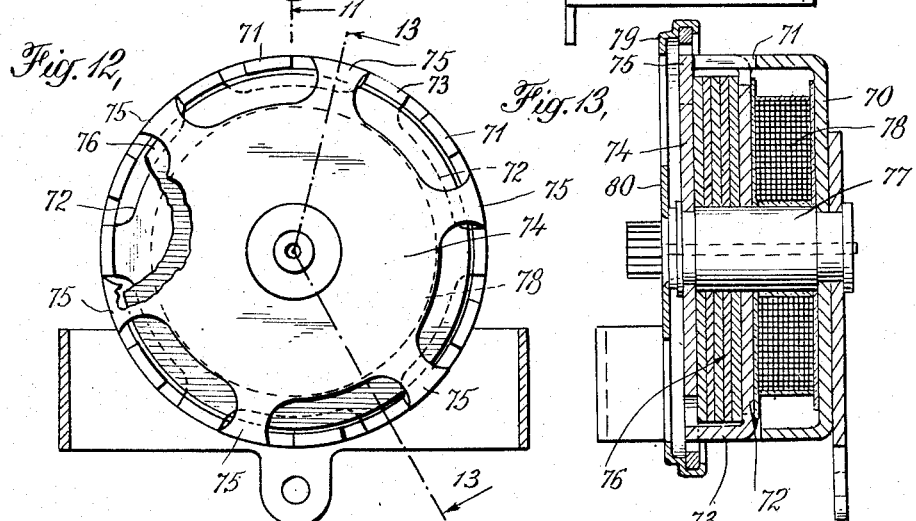
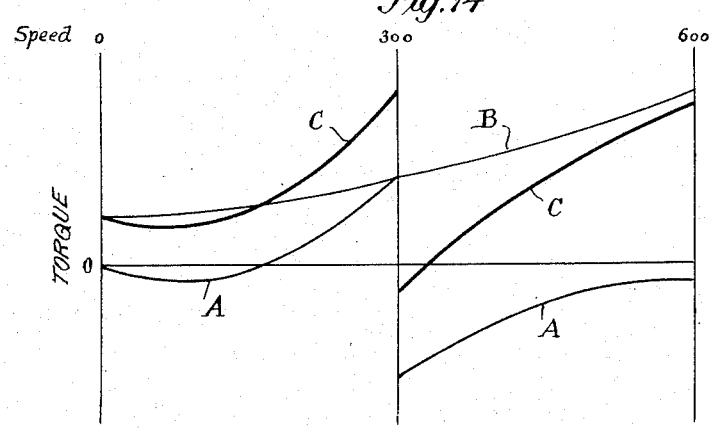

Patented Oct. 16, 1934

1,977,184

UNITED STATES PATENT OFFICE 1,977,184

ELECTRIC MOTOR AND CLOCK

Arthur William Haydon, Waterbury, Conn.

Application August 9, 1933, Serial No. 684,363

19 Claims. (Cl. 172—275)

This invention relates to electric motors and particularly to single-phase motors of the type suitable for operating clock mechanisms and other timing devices.

For many purposes it is desirable to provide a single-phase motor capable of developing considerable starting torque, and also capable of operating at a constant speed determined by the frequency of the alternating current supplied to the motor.

The operating speed of a synchronous motor for a given frequency of alternating current is determined by the ratio between the angular spaced relation of adjacent field poles and the phase relation of the magnetic flux in such poles. Thus considering a motor in which adjacent field poles are spaced 15 mechanical degrees apart, and the magnetic fluxes in such adjacent poles are 180 electrical degrees apart in time phase relation, the synchronous speed of the motor on 60 cycle alternating current will be $$\frac{15}{180} \times 60 \times 60 = 300 \text{ R. P. M.}$$

In this equation, the only variable factor at a given frequency is the ratio between the mechanical angle of pole displacement and the phase angle of magnetic flux for adjacent poles. For convenience, this ratio will be termed the speed ratio herein.

In general, it is desirable that small synchronous motors for operating clock mechanisms or other timing devices run at as low a synchronous speed as practically possible, and this in order to reduce the wear on the moving parts and the noise produced by the operation of the device, as well as to minimize the amount of reduction gearing required. In the past, low operating speeds have been attained by using a very large number of poles and in this manner reducing the above explained speed ratio. This expedient is satisfactory in certain cases if the motor is of the non-self-starting type, but is impractical in a self-starting motor. Single-phase alternating current motors of the type here considered are made self-starting by the use of so-called shading coils, that is, a short-circuited coil is placed about a portion of the magnetic material of each pole, the magnetic pole core being split or subdivided for this purpose. The short-circuited coils usually comprise copper rings or punchings of considerable bulk, and accordingly, the use of these coils necessitates the use of fairly large pole pieces to carry them. This increase in the size of the pole pieces reduces the number of poles which it is possible to provide on a given size motor field structure and accordingly increases the mechanical angular displacement of adjacent poles with a corresponding increase in speed ratio and motor speed.

One of the objects of my invention is to provide a self-starting alternating current motor capable of operating at a comparatively low constant speed and having a high starting torque, the motor being very compact and of simple mechanical construction.

In general, this object is carried out by providing a field member including pole pieces and shading coils so arranged that the ratio between the mechanical angular displacement of adjacent poles and the electrical time phase displacement of flux in adjacent poles is not uniform for all portions of this field member. In other words, the motor of the present invention has a field member so constructed as to provide at least two speed ratios. Thus for example, the field member may comprise one or more groups of adjacent poles which are closely spaced angularly about the periphery of the field, together with one or more intervening groups of more widely spaced poles. Shading coils or equivalent phase shifting means may be provided on the more widely spaced series of poles where the size of the poles is sufficient to accommodate such means. With this arrangement, the motor has two different basic synchronous speeds, a comparatively high speed due to the speed ratio determined by the widely spaced set of adjacent poles, and a comparatively low speed due to the lower speed ratio determined by the closely spaced set of adjacent poles.

Instead of providing two sets of adjacent poles, which have different mechanical angular spacing, two basic synchronous speeds may be provided by mechanically spacing all of the adjacent poles by equal angles and varying the phase angle between the magnetic fluxes in adjacent poles of two pole groups. For example, where the pole pieces are arranged in this manner, certain adjacent poles may carry flux having a time phase displacement of 180°, whereas other pole pairs may carry flux having a time phase displacement of 90°.

The shading coils or other phase shifting means are preferably associated with the portion of the field member which has the highest speed ratio. Thus as indicated above, shading coils are provided on the more widely spaced group of adjacent poles where two speed ratios are obtained by differences in mechanical angular pole spacing.

With this arrangement, the motor has an efficient starting torque which is provided by the high speed ratio portion of the field structure, and this torque, if unimpeded by other factors, would tend to bring the motor up to the highest of its two basic synchronous speeds. The torque due to the lower speed ratio portion of the field member limits the speed of the motor to a predetermined value below the higher synchronous speed, and the motor operates at a speed determined by the field portion having the lower speed ratio. Thus the low speed ratio portion of the field member may be regarded as a governor for limiting the motor speed, whereas the high speed ratio portion of the field member may be regarded as a means for starting and accelerating the motor. The governing effect is due to the fact that any tendency toward acceleration beyond the synchronous speed of the low speed ratio results in a change of the motor armature from a lagging to a leading angle with respect to the flux of the low speed ratio polar structure, and this in turn produces a negative torque which prevents further acceleration. This negative torque more than equalizes the positive torque produced at this speed by the high speed ratio portion of the field member.

The specific embodiments of my invention hereinafter described, each include a field member having a single-phase magnetizing means in the form of a single coil of magnet wire. The coil is mounted on a central core of magnetizable material. A plate or disc of magnetizable material is secured to or otherwise associated with each end of the central core, each of the discs being provided with pole pieces. The arrangement of the central core, the discs of magnetizable material associated therewith, and the pole pieces is preferably such that these parts form a substantially closed magnetic circuit energized by the magnetizing coil. The arrangement is preferably such that the pole pieces form a series of poles disposed in a common plane, and this plane may be disposed at one side of the magnetizing coil and therefore out of the plane of the coil. Where this arrangement is employed, the rotor member may be mounted on a shaft concentric with the central magnetic core and the rotor may comprise magnetic material disposed in close proximity to the pole pieces. This magnetic material is preferably, although not necessarily, in the form of a ring of magnetizable material which may at least partially envelop the pole pieces. If the rotor is of hard steel or of other material capable of retaining some residual magnetism, the motor may operate synchronously as a hysteresis motor. If, on the other hand, the rotor is made of soft iron or other material not capable of retaining any residual magnetism, the motor will operate as an asynchronous motor.

The self-starting characteristic of my improved motor is due to the use of shading coils on certain of the pole pieces, or in other instances, to the use of lag plates of copper or other material of low resistance, the lag plates being arranged in such a manner that they cause the flux in certain pole pieces to lag beyond that in other pole pieces. In either case, a shading effect is produced whereby a rotating field is provided in some or all portions of the field member. The pole pieces affected by the shading means may be directly associated with one or both of the plates of magnetizable material located on opposite sides of the field coils. In some instances, I prefer to provide shading means for some of the pole pieces carried by the discs of magnetizable material on both sides of the field coils, whereas in other instances, none of the pole pieces carried by the discs on one side of the field coils are directly affected by the shading means. In any event, I prefer to have the shading means associated with some of the pole pieces in that portion of the field member having the highest speed ratio, as explained above.

Various additional objects, advantages and characteristic features of the invention will become apparent as the description of certain embodiments thereof progresses.

In the accompanying drawings:

Figure 1 is a vertical sectional view of a motor embodying my invention;

Figure 2 is an elevation of the motor shown in Figure 1;

Figure 3 is a plan view of the motor shown in Figure 1;

Figure 4 is an elevation of one section of the field casing of the motor shown in Figure 1;

Figure 5 is an elevation of another section of the field casing of the motor shown in Figure 1;

Figure 6 is a vertical section of a modified form of motor embodying my invention;

Figure 7 is an elevation of the motor shown in Figure 6;

Figure 8 is an elevation of a modified form of the motor shown in Figure 6;

Figure 9 is an elevation of one section of the field casing of the motor shown in Figure 8;

Figure 10 is an elevation of a motor embodying another modification of my invention;

Figure 11 is a vertical section of the motor shown in Figure 10;

Figure 12 is an elevation of a motor embodying a still further modification of my invention;

Figure 13 is a vertical section of the motor shown in Figure 12; and

Figure 14 is a speed torque curve representing the operation of a typical motor embodying my invention.

Referring to the drawings, the motor illustrated in Figures 1 through 5 has a rotor member 18 mounted on a shaft 19. The armature 20 of the rotor member is a continuous ring preferably made of hardened steel or other material having a high hysteresis coefficient so that it offers considerable resistance to any attempt to change its magnetism.

The rotor armature 20 is mounted in close proximity to the pole pieces of a field member which is shown with the rotor broken away in Figure 2. The pole pieces of the field member are carried by and preferably formed integrally with three field casing sections 21, 22 and 23. As shown in Figures 1, 3 and 4, the casing section 21 comprises a disc having lateral projections, the ends of which form two differently spaced sets of pole pieces 24 and 25. The intermediate casing section 22 also comprises a disc having lateral projections, the ends of which form two sets of pole pieces 26 and 27. The third field casing section 23 comprises a flat element having radial projections, the ends of which form the pole pieces 28. The field sections 21, 22 and 23 are all formed of a suitable magnetic material of low hysteresis characteristic such as soft iron.

The three field casing sections are nested together about a central magnetic core 29 in such a manner that the pole pieces 24, 25, 26, 27 and 28 are in circumferential alignment, each pole piece of each field casing section extending into the space between two pole pieces of another section or sections, as shown in Figure 2. The arrangement of the pole pieces is such that two groups of adjacent magnetic poles having different mechanical angular displacement are provided. Thus referring to Figures 2 and 3, the adjacent magnetic poles of the group 25 and 26 are mechanically spaced approximately 15° apart, whereas, the adjacent magnetic poles of the group 24, 27 and 28 are spaced approximately 30° apart. In connection with the last mentioned group, it should be noted that each adjacent pair of pole pieces 24 may be considered as representing a single magnetic pole which is split or sub-divided to accommodate a shading coil, as hereinafter explained, and that each adjacent pair of pole pieces 27 and 28 together may be considered as a single magnetic pole since the field casing sections 22 and 23 which respectively carry these pole pieces both lie on the same side of the magnetizing coil.

With the described arrangement, it will be seen that the speed ratio of that portion of the field member constituting the pole pieces 25 and 26 is comparatively low due to the comparatively small mechanical angle of displacement between the adjacent poles of this portion, while the speed ratio of the portion of the field member constituting the pole pieces 24, 27, and 28 is comparatively high due to the relatively larger mechanical angle of displacement between adjacent poles in this portion.

The armature 20 of the rotor member closely surrounds the pole pieces, and it will be understood that the most active portions of the pole pieces are thus directly opposite the rotor armature. The outer portions of the pole pieces are so disposed as to be substantially in contact with each other.

A single coil 30 of insulated wire such as magnet wire is wound on the central core 29 and enclosed between the two sections 21 and 22 of the field casing. Single phase alternating current may be supplied to this coil from any suitable source. The radial portions of the casing sections 21 and 22 are located on opposite sides of the coil 30 and accordingly, at any given instant, these two sections are magnetized in such a way that they produce flux of opposite polarity. Accordingly, the unshaded opposite pole pieces 25 and 26 of these sections are of opposite polarity at any given instant, and due to the fact that the current supplied to the coil 30 is an alternating current, the polarity of each of these pole pieces alternates in synchronism with the current. Thus the pole pieces 25 and 26 produce an alternating or fixed magnetic axis field. Due to the above explained small angle between the pole pieces 25 and 26, this field has a relatively low speed ratio.

The remaining poles, formed by the pole pieces 24, 27 and 28, are provided with phase shifting or shading means whereby these poles produce a rotating field. Thus in the disclosed embodiment, the pole pieces 24 are split or sub-divided and short-circuited shading coils 31 comprising punched discs of copper or other highly conductive material are placed around one of the sections of each pole piece 24, as best shown in Figure 4. Shading of the oppositely polarized poles is effected by the use of lag plates 32 between the field casing sections 22 and 23. The lag plates 32 comprise copper discs centrally perforated to accommodate the core 29 which passes therethrough. The shading coils 31 and lag plates 32 act in a known manner to cause the flux passing through the magnetic material surrounded by such coils or plates to lag approximately 90 electrical degrees in time phase relation behind the flux passing through the unshaded portions of this magnetic material. Thus the magnetic flux passing through the portion of each split pole piece 24 which carries a shading coil 31 lags approximately 90 electrical degrees in time phase relation behind the flux passing through the unshaded portion of such pole piece. Also, the flux passing through the pole pieces 28 of the field casing 23, which is shaded by the lag plates 32, lags approximately 90 electrical degrees in time phase relation behind the flux passing through the pole pieces 27 of the unshaded casing section 22.

Due to the above described shading or phase shifting effect, the magnetic field produced by the pole pieces 24, 27 and 28 is a moving or rotating magnetic axis field. It should be noted that this rotating field is provided on the field portion having a relatively high speed ratio, the wider angular spacing of the field poles in this portion serving to accommodate the shading coils without undue crowding or increase in the overall dimensions of the motor.

The motor may be connected to drive any suitable means such as a clock mechanism, and as shown, a pinion 33 on the rotor shaft 19, meshing with a gear 34, may be used for this purpose. The motor structure may be carried by any suitable support such as the bracket 35 which may be connected to the field casing by expanding the core or by a flange 36 on the core 29, as shown.

The operation of the motor will be best understood by first considering the action on the rotor armature 20 of that portion of the field member which has the higher speed ratio and which produces a rotating axis field due to the above described shading means. Assume that at any given instant the current flowing in the coil 30 is in such a direction as to cause the unshaded portion of the pole pieces 24 to become north poles and the unshaded pole pieces 27 to become south poles. The shading coils 31 cause the magnetic flux in the shaded pole piece portions 24 to lag approximately 90° in time phase relation behind the flux in the unshaded portions of the pole pieces 24, and in a like manner, the lag plates 32 cause the flux in the pole piece portions 28 to lag approximately 90° behind the flux in the pole piece portions 27. Thus as the alternating current flows in the coil 30, a magnetic field comprising adjacent north and south poles rotates about the periphery of the field member. The north and south poles of this rotating field produce corresponding opposite poles in the adjacent portions of the armature 20, and this armature polarity temporarily persists due to the high hysteresis coefficient of the armature metal. The induced polarity rotates about the armature ring but lags behind the polarity of the rotating magnetic field of the field member, this lag being due to the high hysteresis coefficient of the armature. Thus the residual magnetism in the armature tends to preserve the polarity of the armature and to this extent, a couple is produced between the rotating field polarity and the lagging armature polarity, and this couple rotates the armature and causes its acceleration.

If the armature rotor 20 were subject to the action of the high speed ratio poles alone, the motor would accelerate to the synchronous speed of these poles whereupon the armature polarity would no longer rotate about the armature ring but would become fixed. In the illustrated case, since these poles are spaced approximately 30° apart, and the time phase displacement of the flux therein is 180 electrical degrees, the synchronous speed of these poles is approximately 600 R. P. M. with 60 cycle current in the magnetizing coil 30. This speed is not attained however, due to the governing effect of the low speed ratio field pole pieces 25 and 26. These pole pieces produce an alternating magnetic field which produces a torque in the rotor armature in a manner similar to that described above in connection with the high speed ratio poles, except that the low speed ratio torque is zero at standstill and negative at low speeds, becoming positive only at above approximately one-half synchronous speed. When the rotor speed reaches the synchronous speed of the low speed ratio poles (which with 60 cycle current and the 15° pole spacing illustrated would be 300 R. P. M.) the positive torque due to the low speed ratio poles is maximum, but upon any tendency toward further acceleration, the resulting change of the rotor from a lagging to a leading angle with respect to the flux of the low speed ratio poles produces maximum negative torque which prevents further acceleration. This negative torque is of considerably greater magnitude than the positive torque due to the high speed ratio poles at this speed, and accordingly, the motor operates at a constant speed which is the low speed ratio synchronous speed. In this manner, the low speed ratio poles act as a governor for limiting the motor speed to the desired constant value.

The action of the motor is represented by the speed torque curves of Figure 14. The curve A represents the torque produced by the low speed ratio polar structure, this torque being zero at standstill, slightly negative at low speeds, positive at above approximately half speed, maximum positive at the low speed ratio synchronous speed of 300 R. P. M., and maximum negative if the rotor armature moves to a leading angle with respect to the low speed ratio flux at this synchronous speed. The curve B represents the torque produced by the high speed ratio polar structure, this torque being positive at standstill due to the rotating characteristic produced by the shading means on the high speed ratio poles. The high speed ratio field torque increases to a maximum at 600 R. P. M. which is the synchronous speed of this field. The motor torque which results from the combined high and low speed polar torques is represented by the curve C. It will be noted that this torque is positive between zero and 300 R. P. M., which is the synchronous speed of the low speed ratio field structure, then becoming negative due to the fact that the negative low speed ratio torque developed if the rotor armature moves from a lagging to a leading angle at this speed is of greater magnitude than the positive high speed ratio torque at this point. An inspection of the torque speed curve C shows that the motor is self-starting, having a suitably high starting torque which accelerates the motor up to 300 R. P. M., at which point its speed becomes constant. Thus the motor combines suitably high starting torque with suitably low running speed, and this without undue enlargement of the motor dimensions.

The motor disclosed in Figures 6 and 7 operates on the same general principles as have been described above in connection with the motor of Figures 1 through 5, but is of considerably simpler construction. This motor employs a rotor member 38 carried on a shaft 39 and provided with a continuous ring armature 40 composed of hardened steel or equivalent material having a high hysteresis coefficient. The field member comprises an outer casing section 41 having lateral projections which form the pole pieces 42, 43 and 44, together with an inner casing section 45 having radial projections which form the pole pieces 46 and 47. The two casing sections 41 and 45 are mounted on a central magnetic core 48 surrounded by a magnetizing or field coil 49 which is enclosed between the casing sections as shown and is energized with single phase alternating current from any suitable source. The pole pieces 46 and 47 of the inner casing section are disposed between and in circumferential alignment with the pole pieces of the outer casing section, as shown in Figure 7.

The pole piece arrangement is such that all of the adjacent opposite poles are substantially equally spaced, and in the disclosed embodiment, the mechanical angle between each adjacent pair of opposite pole pieces is approximately 15°. Since the casing sections 41 and 45 are located on opposite sides of the coil 49, when the coil is energized these two sections are magnetized so as to produce flux of opposite polarity at any given instant. Accordingly, the opposite pole pieces 42—46 and 44—47 are of opposite polarity at any given instant and this polarity alternates in synchronism with the alternations of the current supplied to the coil 49. Shading or phase shifting means are provided on the pole pieces of one casing section only, in the illustrated case, the outer casing section 41. I have found that shaded pole pieces on the other casing section may be omitted without any considerable decrease in the starting torque produced by the shaded polar structure. Thus the pole pieces 43 on the outer casing section 41 are provided with shading coils 50 which may comprise punched copper disks, and the adjacent pole pieces 47 on the inner casing section are cut away, as indicated at 51, at the point where shaded pole pieces would be disposed if they were employed on this section.

The shading coils 50 on the pole pieces 43 cause the flux passing through these poles to lag approximately 90 electrical degrees in time phase relation behind flux passing through the unshaded pole pieces 44. Due to this phase shifting effect, the magnetic field produced by the pole pieces 44, 43 and 47 is a moving or rotating axis field which produces starting torque for the motor. It will be noted that the mechanical angle between the adjacent pole pieces of this group 44, 43 and 47 is approximately 15° and the difference in time phase relation between the flux in adjacent poles of the group is 90 electrical degrees, hence the synchronous speed of the motor due to this polar group is approximately 600 R. P. M.

The remaining polar group comprises the governing pole pieces 42 and 46. No phase shifting or shading means are employed on this polar group, and hence the difference in time phase relation between the flux in adjacent poles is 180 electrical degrees and the synchronous speed due to these poles is 300 R. P. M. The magnetic field produced by the pole pieces 42 and 46 is a stationary axis field and is consequently incapable of developing starting torque.

The motor of Figures 6 and 7 operates in essentially the same manner as that described above in connection with the motor of Figures 1 through 5. Thus when alternating current flows in the coil 49, a rotating axis magnetic field is produced by the starting polar structure comprising the pole pieces 44, 43 and 47, this field comprising adjacent north and south magnetic poles which rotate about the periphery of the field member. The poles of this rotating field induce corresponding opposite poles in the adjacent portions of the armature ring 40 and due to the high hysteresis constant of the armature metal, this induced polarity lags behind the polarity of the rotating magnetic field and a couple is produced which rotates and accelerates the armature. This acceleration is produced by the high speed ratio polar structure which has a synchronous speed of 600 R. P. M. in the disclosed embodiment, but the rotor 38 does not attain this speed due to the governing effect of the low speed ratio poles 42 and 46.

After the motor has accelerated to approximately one-half of the synchronous speed of the low speed ratio or governing poles 42 and 46, the torque due to these poles becomes positive, and this torque reaches its maximum value at the synchronous speed of these poles, in the illustrated case, 300 R. P. M. on 60 cycle current. Upon any tendency toward further acceleration due to the high speed ratio magnetic field, the resulting change of the rotor armature 40 from a lagging to a leading angle with respect to the flux of the low speed ratio polar structure produces maximum negative torque and prevents further acceleration. Thus the low speed ratio poles limit the motor speed to a constant value determined by the frequency of the current supplied to the coil 49.

The above described starting and running operation of the motor of Figures 6 and 7 is illustrated by the curves of Figure 14, in the manner described in connection with the motor of Figures 1 through 5. Thus the torque due to the high speed ratio starting poles 44, 43 and 47 may be represented by the torque speed curve B, and that due to the governing or low speed ratio poles 42 and 46 may be represented by the curve A. The resultant operating torque of the motor is shown by the curve C. As shown in Figure 14, the resultant torque reaches its maximum value at the synchronous speed of low speed ratio or governing poles and becomes negative upon any tendency of the speed to increase above this value.

It will be noted that the motor of Figures 6 and 7 has four pairs of governing poles 42 and 46 and two groups of starting or accelerating poles 44, 43 and 47. In order to increase the starting torque of the motor while still maintaining sufficient governing torque to prevent acceleration beyond the synchronous speed of the low speed ratio poles, the motor may be constructed with three groups of self-starting or accelerating poles and three groups of governing poles. This construction has been shown in Figures 8 and 9. The inner section 45' of the field member is provided with six symmetrically distributed radial pole pieces 47', and the outer section 52 has three equally spaced groups of divided pole pieces 53 and 54 alternating with three undivided pole pieces 55 about its periphery. The pole pieces 54 are provided with shading coils 56 and accordingly, the three polar groups which comprise the adjacent pole pieces 53, 54 and 47' constitute the self-starting high speed ratio poles, and the three polar groups comprising the adjacent pole pieces 55 and 47' constitute the low speed ratio governing poles. It will be clear that this motor operates in the manner described above in connection with the motor of Figures 6 and 7, its starting and accelerating torque being due to the rotating magnetic field produced by the high speed ratio starting polar groups 53, 54 and 47' and the operating speed being maintained constant at approximately 300 R. P. M. under the control of the low speed ratio governing polar groups 55 and 47'. Because of the increased number of starting polar groups, the motor of Figures 8 and 9 has a quicker pick-up from standstill than the motor of Figures 6 and 7.

The modification of my invention shown in Figures 10 and 11 has a field structure provided with a plurality of similar sets of poles each of which produce both starting high speed ratio torque and governing low speed ratio torque. As shown in the drawings, the outer section 57 of the field member has lateral extensions forming the pole pieces 58 and 59 which are equally spaced about the periphery of the field member. The inner field member section 60 has radial extensions forming the six equally spaced pole pieces 61, each of which is disposed between and in substantial peripheral alignment with a pair of outer section pole pieces 58 and 59. The magnetizing or field coil 62 is mounted between the casing sections 57 and 60, and a rotor 63 carrying an armature ring 64 of high hysteresis coefficient material, such as hardened steel, is carried by a shaft 65 journaled in the central core 66.

Each of the pole pieces 58 is provided with a shading coil 67. Thus each set of poles consists of a shaded pole 58 on the outer casing section 57, an unshaded pole 61 on the inner casing section 60 and an unshaded pole 59 on the outer casing section 57, in the order named. In each such set, the poles 58 and 61 may be considered as the high speed ratio starting poles and the poles 61 and 59 comprise the low speed ratio governing poles.

The high speed ratio starting poles 58 and 61 are spaced apart by an angle of approximately 15°, and due to the shading coils 67, the flux in the poles 58 lags approximately 90 electrical degrees in time phase relation behind the flux in the unshaded poles 59 of the outer casing section 57. Hence the difference in time phase relation between the flux in the poles 58 and 61 is substantially 90 electrical degrees, and the synchronous speed of the high speed ratio poles is 600 R. P. M. The low speed ratio governing poles 61 and 59 are also spaced by an angle of approximately 15°, and since neither of these poles is shaded, the difference in time phase relation between the flux in these poles is 180 electrical degrees and the synchronous speed due to the field produced thereby is 300 R. P. M. An alternating magnetizing current of 60 cycle frequency has been assumed in determining these synchronous speeds.

When single phase field coil 62 is energized with alternating current of 60 cycle frequency, the high speed ratio starting poles 58 and 61 produce a rotating axis magnetic field which starts and accelerates the motor. As the motor speed increases to over one-half of the synchronous speed of the low speed ratio governing poles 61 and 59, the stationary axis magnetic field of these poles produces a positive torque which becomes maximum at the synchronous speed thereof, in the present case, at 300 R. P. M. Since the torque of the governing poles 61 and 59 is negative beyond this speed and is of greater magnitude than the positive torque due to the high speed ratio starting poles 58 and 61 at this speed, the motor operates at a constant speed determined by the speed ratio of the governing poles 58 and 61. This operation in starting and running is graphically illustrated in the curves of Figure 14.

The motor of Figures 10 and 11 has a high starting torque and a high synchronizing torque, and these desirable characteristics are obtained without enlarging the overall dimensions of the motor. The use of a pole piece on one of the field casing members to cooperate with both a shaded pole and an unshaded pole on the oppositely polarized member produces both high starting torque and high synchronizing or governing torque without material complication or enlargment of the field structure. The motor may be readily assembled to rotate in either direction without change in the construction of the parts, and a change of rotation may be made without removing the shading coils 67 from the pole pieces 58. Thus the pole pieces 61 on the inner field casing member 60 may be shifted to the opposite sides of the shaded pole pieces 58 from that shown in the drawings with the result that the direction of rotation of the rotating axis magnetic field due to the poles 61 and 58 is reversed, causing the motor to reverse its direction of operation.

When it is desirable or necessary to decrease the overall diameter of the motor of Figures 10 and 11 and to increase the diameter of its field coil, this may be accomplished by substituting lag plates surrounding the central core for the shading coils 67 on the pole pieces. A motor of this construction has been shown in Figures 12 and 13. This motor has an outer field casing member 70 with lateral projections forming the pole pieces 71, an intermediate field casing member 72 with lateral projections forming the pole pieces 73 and an inner field casing member 74 with radial projections forming the pole pieces 75. A plurality of copper lag plates 76 are disposed about the central core 77 between the intermediate section 72 and the inner section 74. With this arrangement, when alternating current flows in the coil 78, the pole pieces 71 and 73 are oppositely polarized with alternating flux, and the difference in time phase relation between the flux in these poles is 180 electrical degrees. The copper plates 76 act as shading means and cause the alternating flux in the pole pieces 75 to lag approximately 90 electrical degrees in time phase relation behind the flux in the pole pieces 73.

The motor of Figures 12 and 13 operates in the same manner as does the motor of Figures 10 and 11. Thus the poles 71 and 73 which comprise the low speed ratio governing poles produce a stationary axis alternating magnetic field having a synchronous speed of 300 R. P. M. and the poles 73 and 75, which are the high speed ratio starting poles, produce a rotating axis magnetic field having a synchronous speed of 600 R. P. M., 60 cycle current in the field coil being assumed. The rotating field of the high speed ratio starting poles 73 and 75 produces a torque in the high hysteresis coefficient armature ring 79 and so accelerates the rotor 80, and the speed of rotation of the rotor is limited to 300 R. P. M. by the torque due to the alternating magnetic field of the low speed ratio governing poles 71 and 73.

As will be apparent from a comparison of Figures 11 and 13, the substitution of lag plates for shading coils decreases the outside diameter of the motor and permits an increase in the diameter of the field coil, while at the same time, slightly increasing the thickness of the motor structure. This adaptability to modification in dimensions and proportions permits the use of motors embodying my invention in a variety of clock constructions and other mechanisms where the space available for the motor is necessarily limited.

I claim:

1. An alternating current motor comprising a field member having a plurality of pole pieces, single phase means for magnetizing said pole pieces, means for producing a time phase displacement of the flux in certain pole pieces, the arrangement of the pole pieces and of said means being such that the ratio between the angular displacement of adjacent pole pieces and the time phase relation of the flux in such pole pieces is non-uniform throughout said field member and a single armature responsive to the flux from all of the pole pieces.

2. An alternating current motor comprising a field member having a plurality of pole pieces, means for producing a stationary axis magnetic field in a portion of said member and a rotating axis magnetic field in another portion of said member and a single armature responsive to the flux from both portions of said field member.

3. An alternating current motor comprising a field member having a plurality of pole pieces, means for producing a stationary axis alternating magnetic field in a portion of said member and a rotating axis magnetic field in another portion of said member and a single rotor of magnetic material responsive to the flux from both portions of said field member, the pole pieces being arranged in such a manner that the rotating axis field is capable of producing a positive torque in such rotor over a predetermined speed range and the stationary axis field is capable of producing synchronous operation of said rotor at a speed within said predetermined range.

4. An alternating current motor comprising a field member having a plurality of pole pieces, single phase means for magnetizing said pole pieces, means for producing a magnetic flux distribution such that the phase displacement between the flux in at least one pair of adjacent poles is less than the phase displacement between the flux in at least one other pair of adjacent poles and an armature of uniform magnetic reluctance responsive to the flux from each adjacent pairs of poles.

5. An electric motor comprising a field member, single phase means for magnetizing said field member, a group of poles of opposite relative polarity on said field member for producing a stationary axis alternating magnetic field, another group of poles of opposite relative polarity on said field member provided with phase shifting means for producing a rotating axis magnetic field and an armature of uniform magnetic reluctance responsive to the flux from both of said groups of poles.

6. An electric motor comprising a field member, single phase means for magnetizing said field member, a group of poles of opposite relative polarity on said field member having a predetermined speed ratio and arranged to produce a stationary axis alternating magnetic field, another group of poles of opposite relative polarity on said field member having a higher speed ratio and provided with phase shifting means for producing a rotating axis magnetic field and an armature of uniform magnetic reluctance responsive to the flux from each of said groups of opposite poles.

7. An alternating current motor comprising a field member having a plurality of pairs of pole pieces with the poles of each pair spaced substantially the same angular distance apart, single phase means for producing a magnetic flux distribution such that the phase displacement between the flux in at least one pair of adjacent poles is less than the phase displacement between the flux in at least one other pair of adjacent poles and a single armature responsive to the flux from all of said pairs of adjacent poles.

8. An electric motor comprising two groups of poles of different angular displacement, means responsive to single phase alternating current for magnetizing said poles to produce alternate poles of opposite sign in each of said groups of poles and a single armature responsive to the flux from both of said groups of poles.

9. An electric motor comprising two groups of poles, means responsive to single phase alternating current for producing poles of opposite sign in each of said groups, the pole pieces being arranged in such a manner that the poles of opposite sign of one group are spaced farther apart than the corresponding poles of opposite sign of the other group and a single armature adjacent said poles and responsive to the flux from all of said poles of both of said groups.

10. An electric motor comprising two groups of poles of different angular displacement, means responsive to single phase alternating current for magnetizing said poles, means cooperating with one group of poles for producing a rotating axis magnetic field from the flux of said group and a single armature responsive to the flux from both of said groups of poles.

11. An electric motor comprising a field structure having two groups of oppositely polarized poles of different angular displacement, single phase means for magnetizing said poles, means for producing a rotating axis magnetic field cooperating with the group of poles having the greater angular displacement and a single armature adjacent said poles and responsive to the flux from all of said poles of both of said groups.

12. An alternating current electric motor comprising a field member, single phase means for magnetizing said field member, a group of poles on said field member comprising two poles of opposite relative polarity disposed adjacent each other, another group of poles on said field member comprising two poles of opposite relative polarity and a shaded pole disposed therebetween the angular displacement of said adjacent poles of opposite relative polarity being less than the angular displacement between said poles of opposite relative polarity having said shaded pole therebetween, and a single armature responsive to the flux from both of said groups of poles.

13. An alternating current electric motor comprising a field member, single phase means for magnetizing said field member, a group of poles on said field member comprising two poles of opposite relative polarity disposed adjacent each other, another group of poles on said field member comprising two poles of opposite relative polarity and a shaded pole disposed therebetween, said group comprising adjacent poles having a lower speed ratio than said group comprising poles of opposite relative polarity with a shaded pole therebetween and a single armature adjacent said poles and responsive to the flux from all of said poles of both of said groups.

14. An alternating current electric motor comprising a field member, single phase means for magnetizing said field member and a plurality of sets of poles on said field member, the poles of each of said sets comprising two unshaded poles of opposite polarity having a predetermined speed ratio and cooperating to produce a stationary axis magnetic field, a shaded pole circumferentially aligned with said unshaded poles and cooperating with one of said unshaded poles to produce a rotating axis magnetic field, said shaded pole and the unshaded pole cooperating therewith having a higher speed ratio than that of said cooperating unshaded poles and an armature of uniform magnetic reluctance adjacent said poles and responsive to the flux from all of said poles.

15. An alternating current electric motor comprising a field member including two magnetizable sections, single phase means for magnetizing said sections with opposite instantaneous polarity and pole pieces on said sections cooperating to form a plurality of sets of three adjacent poles of substantially equal angular displacement, the poles of each of said sets comprising a pole on one of said sections disposed between and adjacent to two poles of the other of said sections and means for causing a time phase displacement of the flux in one only of said poles on said other section.

16. An alternating current motor comprising a field member having a plurality of pole pieces, means for producing a stationary axis magnetic field in a portion of said member, means for producing a rotating axis magnetic field in another portion of said member, and an armature of uniform magnetic reluctance rotatably mounted adjacent said field member and responsive to the flux from both said portions of said field member.

17. An alternating current motor comprising a field member having a plurality of pole pieces, means for producing a stationary axis alternating magnetic field in a portion of said member and a rotating axis magnetic field in another portion of said member and a single rotor of uniform magnetic reluctance responsive to both said stationary axis field and said rotating axis field, the pole pieces being arranged in such a manner that the rotating axis field is capable of producing a positive torque in such rotor over a predetermined speed range and the stationary axis field is capable of producing synchronous operation of said rotor at a speed within said predetermined range.

18. An alternating current electric motor comprising a field member, single phase means for magnetizing said field member, a plurality of sets of poles on said field member, each including poles of opposite relative polarity, means for providing different speed ratios between different pairs of poles of opposite relative polarity in each of said sets and a single armature responsive to the flux from all of said sets of poles.

19. An alternating current electric motor comprising a field member, single phase means for magnetizing said field member, a plurality of sets of poles on said field member, each of said sets comprising two adjacent circumferentially aligned unshaded poles and a third pole adjacent one of said unshaded poles and circumferentially aligned therewith, and shading means for shifting the phase of the flux in said third pole.

ARTHUR WILLIAM HAYDON.